United States Patent
Tominaga

(10) Patent No.: US 9,068,865 B2
(45) Date of Patent: Jun. 30, 2015

(54) METER WITH POINTER

(71) Applicants: DENSO International America, Inc., Southfield, MI (US); DENSO CORPORATION, Kariya, Aichi-pref. (JP)

(72) Inventor: Hiroshi Tominaga, Kariya (JP)

(73) Assignees: DENSO International America, In.c, Southfield, MI (US); DENSO CORPORATION, Kariya, Aichi-pref. (JP)

( * ) Notice: Subject to any disclaimer, the term of this patent is extended or adjusted under 35 U.S.C. 154(b) by 273 days.

(21) Appl. No.: 13/660,202

(22) Filed: Oct. 25, 2012

(65) Prior Publication Data

US 2014/0116322 A1   May 1, 2014

(51) Int. Cl.
*G01D 11/28* (2006.01)
*G01D 13/26* (2006.01)

(52) U.S. Cl.
CPC .............. *G01D 11/28* (2013.01); *G01D 13/265* (2013.01)

(58) Field of Classification Search
CPC ............................. G01D 11/28; G01D 13/265
USPC ........................... 116/286, 287, 288, DIG. 36
See application file for complete search history.

(56) References Cited

U.S. PATENT DOCUMENTS

| 6,082,288 | A * | 7/2000 | Kato et al. ................... 116/286 |
| 6,974,220 | B2 * | 12/2005 | Birman et al. ................. 362/26 |
| 7,207,117 | B1 | 4/2007 | Cook et al. |
| 7,404,374 | B2 | 7/2008 | Kato |
| 7,448,341 | B2 | 11/2008 | Cook et al. |
| 7,520,241 | B2 | 4/2009 | Pala et al. |
| 7,675,428 | B2 | 3/2010 | Pala et al. |
| 7,724,129 | B2 | 5/2010 | Altomonte |
| 7,779,774 | B2 | 8/2010 | Liu |
| 7,810,445 | B2 | 10/2010 | Krishnamurthy |
| 7,934,463 | B2 | 5/2011 | Cook |
| 8,225,736 | B2 | 7/2012 | Cook |

FOREIGN PATENT DOCUMENTS

| JP | 06300590 | A | * | 10/1994 | ............ G01D 13/28 |
| JP | 2004163261 | A | * | 6/2004 | ............ G01D 13/28 |
| JP | 2004271418 | A | * | 9/2004 | ............ G01D 13/28 |
| JP | 2005061920 | A | * | 3/2005 | ............ G01D 11/28 |
| JP | 2011058910 | A | * | 3/2011 | ............ G01D 13/22 |
| JP | 2011064668 | A | * | 3/2011 | ............ G01D 13/22 |
| JP | 2011133349 | A | * | 7/2011 | ............ G01D 11/28 |
| JP | 2012088057 | A | * | 5/2012 | ............ G01D 13/22 |

OTHER PUBLICATIONS

U.S. Appl. No. 13/660,151, filed Oct. 2012, Tominaga.

* cited by examiner

*Primary Examiner* — R. A. Smith
(74) *Attorney, Agent, or Firm* — Harness, Dickey & Pierce, P.L.C.

(57) ABSTRACT

A meter has a pointer which points indicators to show a vehicle status value. The meter has a light source to illuminate the pointer. The light source is disposed to be rotatable with the pointer. The meter has an electromagnetic power supplying device having a primary module and a secondary module. The primary module provides a stationary transmitter module which generates radio frequency electromagnetic field. The secondary module provides a movable receiver module which induces electric power by receiving the radio frequency electromagnetic field generated by the primary module. The secondary module supplies power to the light source.

6 Claims, 4 Drawing Sheets

METER WITH POINTER

TECHNICAL FIELD

The disclosure relates to a meter with a pointer.

BACKGROUND

Conventionally, a meter has a rotatable pointer which points an indicator for showing a vehicle status value. U.S. Pat. No. 6,082,288 discloses a meter with a pointer which is capable of illuminating itself by a light source mounted on the pointer. The pointer is configured to guide light entered into the pointer from an entering surface toward a distal end. This arrangement is advantageous to shorten a distance between the light source and the entering surface and is possible to increase brightness of the pointer compare to an arrangement in which a pointer is supplied with light from a light source mounted on a circuit board remotely located from the pointer.

SUMMARY

The meter disclosed in U.S. Pat. No. 6,082,288 has a wire connection between a fixed circuit board and the light source mounted on the pointer in order to supply electric power from a fixed circuit board to the light source. The wire connection is provided by an FPC (Flexible Printed Circuit) which is formed in a coiled shape about an rotational axis of the pointer. The wire connection requires complex mechanical structure around the rotational axis. In addition, the FPC provides a mechanical connection, therefore, the FPC receives stress and applies reaction force on the pointer as the pointer is rotated. Therefore, the conventional arrangement requires a pointer driving source which is capable of outputting high torque. In addition, there is a possibility that the reaction force may lowers pointing accuracy of the pointer.

It is an object of the present disclosure to provide a meter with pointer which is capable of supplying power to the pointer by simple structure.

It is another object of the present disclosure to provide a meter with pointer which is capable of reducing number of components for supplying power to the pointer.

It is still another object of the present disclosure to provide a meter with pointer which has an electromagnetic power supplying connection for the pointer with high efficiency.

According to an embodiment, a meter with a pointer is provided. The meter comprises a pointer which rotates to point an indicator showing a value, and a light source which rotates with the pointer and illuminates the pointer. The meter further comprises a primary module which transmits electric power in a wireless manner, and a secondary module which rotates with the pointer and supplies electric power to the light source by receiving electric power from the primary module.

This arrangement is advantageous to shorten a distance between the light source and entering surface and is possible to increase brightness of the pointer compare to an arrangement in which a pointer is supplied with light from a light source mounted on a circuit board remotely located from the pointer.

According to the embodiment, it is possible to simplify a structure about the center axis. As a result, it is possible to illuminate the pointer with high brightness by using a simple structure which may apply less load on the pointer.

BRIEF DESCRIPTION OF THE DRAWINGS

The above and other objects, features and advantages of the present disclosure will become more apparent from the following detailed description made with reference to the accompanying drawings. In the drawings.

DETAILED DESCRIPTION

Hereinafter, embodiments of the present disclosure are described in detail referring to the attached drawings. In the description, redundant explanation is omitted by using the same reference numbers to indicate the same or corresponding members. In a case that only a part of component or part is described, other descriptions for the remaining part of component or part in the other description may be incorporated.

First Embodiment

Figure 1:
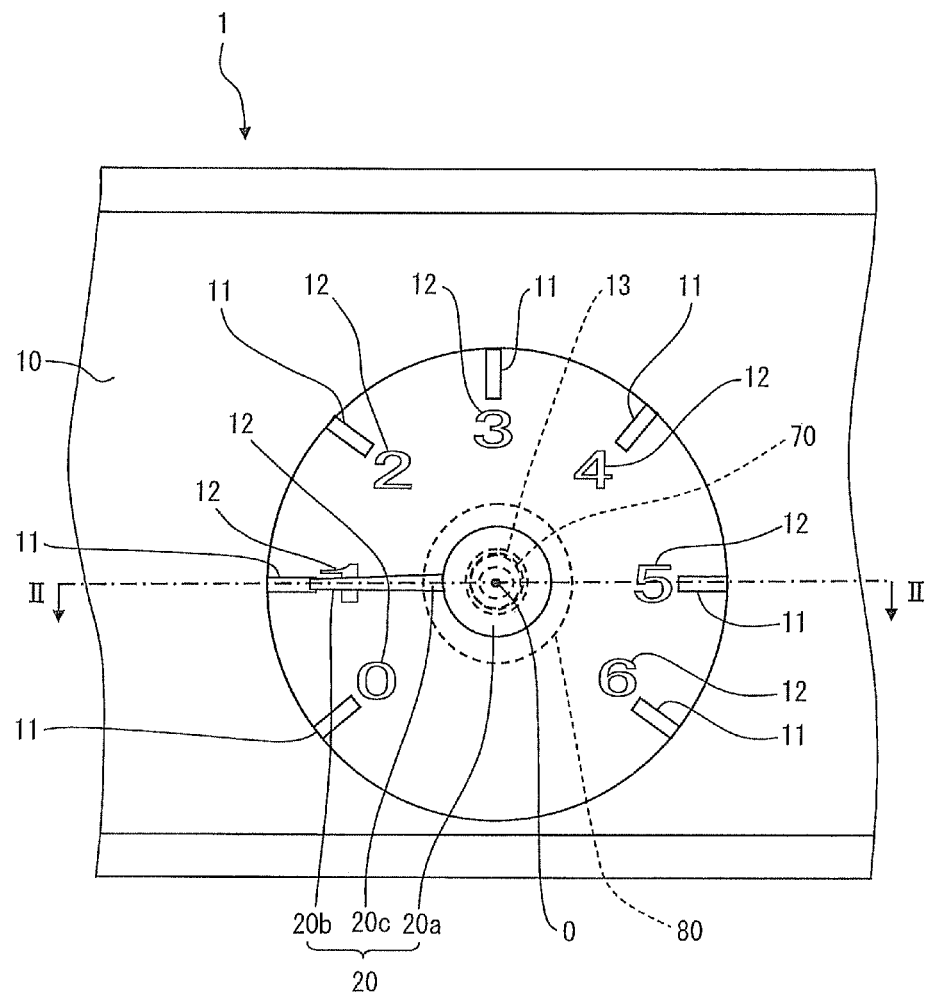
FIG. 1 is a front view of a meter according to a first embodiment of the present disclosure.
Figure 2:
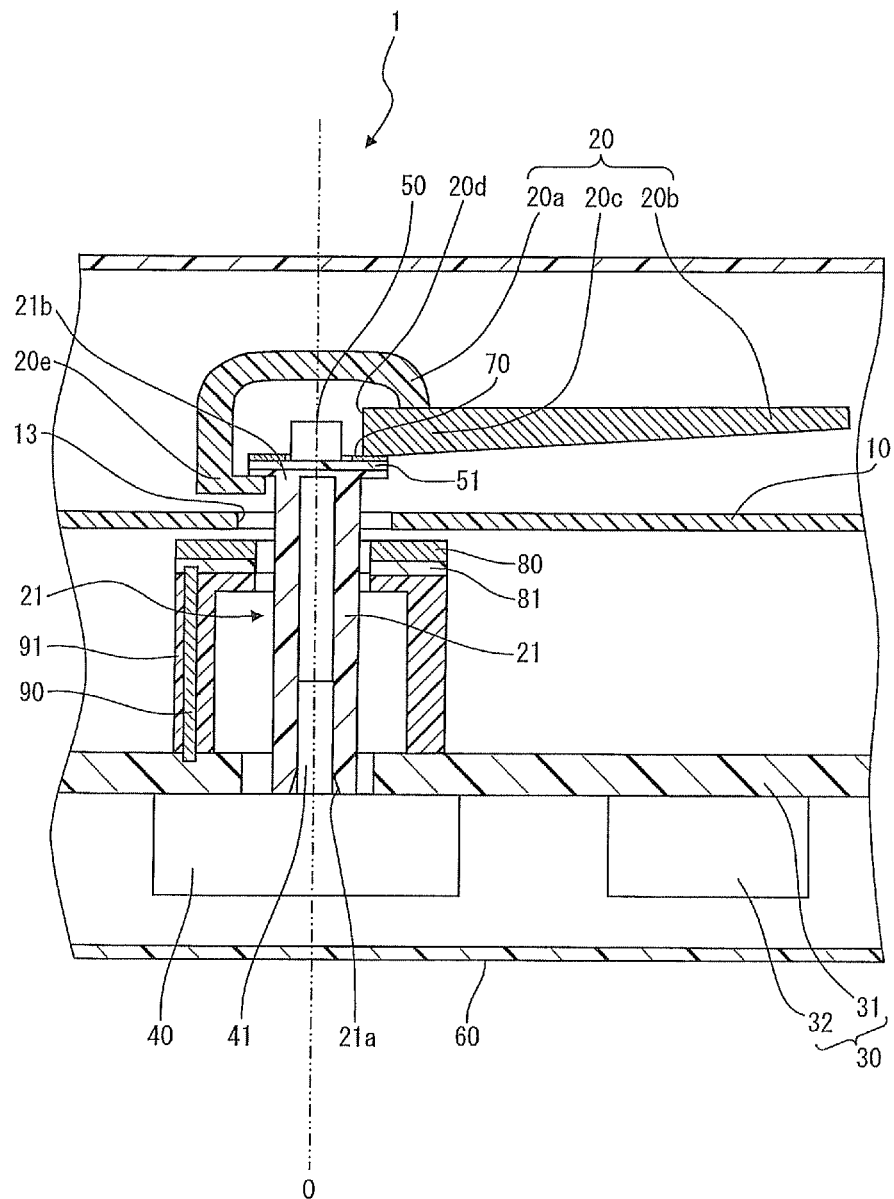
FIG. 2 is a sectional view on a line II-II in FIG. 1.
Figure 3:
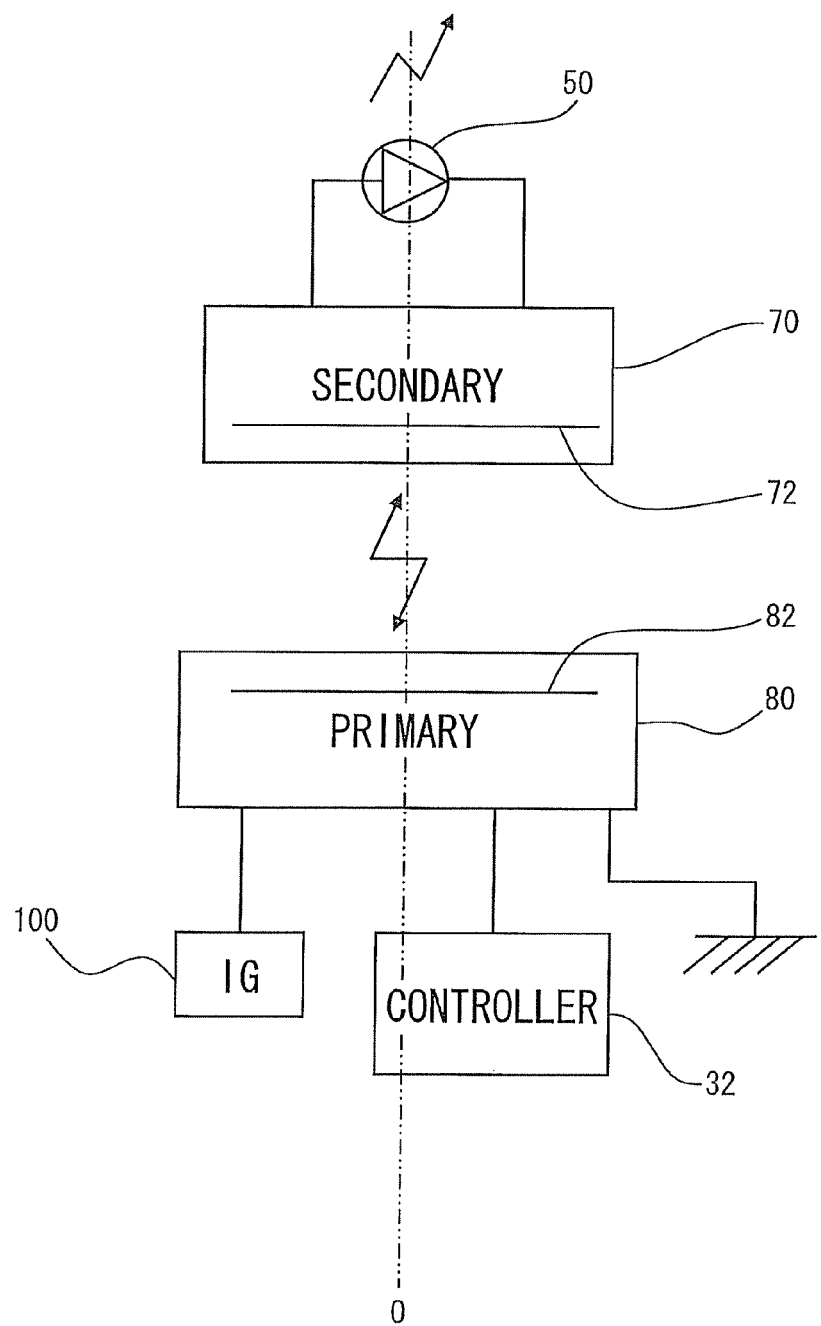
FIG. 3 is a block diagram according to the first embodiment.

Referring to FIGS. 1 to 3, the first embodiment of the disclosure is a meter 1 for vehicle. The meter 1 is installed in an instrument panel disposed in front of a seat for a driver. In this embodiment, the driver or a passenger of the vehicle is assumed as a viewer of the meter 1. The meter 1 has a front face which faces the viewer, but is directed toward a backward direction of the vehicle. In the following description, a direction from the meter 1 toward the viewer is referred to as a front direction.

The meter 1 has components, such as a dial board 10, a pointer 20, an electronic-circuit unit 30, a driving source 40, a light source 50, a case 60, and an electromagnetic power supplying device 70 and 80. The electromagnetic power supplying device provides a wireless electric power supplying device. The electromagnetic power supplying device has a primary module 80 and a secondary module 70. The primary module 80 provides a stationary transmitter module which generates radio frequency electromagnetic field. The secondary module 70 provides a movable receiver module which induces electric power by receiving the radio frequency electromagnetic field generated by the primary module 80. The primary module 80 may be referred to as a wireless power supply module. The secondary module 70 may be referred to as a light source power supply module.

The dial board 10 is formed in a plate shape with resin. The dial board 10 has indicators having scales 11 and numbers 12. The indicators are printed on the dial board 10. The scales 11 and numbers 12 are the indicators for showing a vehicle status value, such as a speed of the vehicle. The indicators are located on the dial board 10 to be pointed by the pointer 20. The dial board 10 is formed with an opening 13 which has a circular peripheral edge. The opening 13 is formed on a center of a circumference where the indicators 11 and 12 are arranged. The dial board 10 may be made from polycarbonate or acrylic resin.

The pointer 20 is made from resin. The pointer 20 is formed in a thin and long needle shape which is extended from a base end 20a to a distal end 20b. The distal end 20b is thinner than the base end 20a. The pointer 20 displays a value of vehicle status by pointing one of a plurality of indicators 11 and 12. The pointer 20 points one of the indicators 11 and 12 at a specific rotational position. The pointer 20 is arranged in front of the dial board 10, i.e., between the viewer and the dial board 10. The pointer 20 is rotatable along the dial board 10. The pointer 20 is connected with the driving source 40 at the base end 20a.

The electronic-circuit unit 30 has a circuit board 31 and a controller 32. The circuit board 31 is made of a glass epoxy board etc. The controller 32 is provided by an electronic control unit, such as a microcomputer etc., and is mounted on the circuit board 31. The controller 32 controls the driving source 40 and the light source 50. The electronic-circuit unit 30 is disposed behind the dial board 10 by mounting the dial board 10 and the circuit board 31 in the case 60.

The driving source 40 has a shaft 41 which supports the base end 20a of the pointer 20. The shaft 41 is inserted in a bracket 21. The bracket 21 is connected to the base end 20a of the pointer 20. The driving source 40 rotates the pointer 20 via the shaft 41 and the bracket 21. The bracket 21 is formed in a cylindrical shape and has a top end where the secondary module 70 is mounted. The driving source 40 is mounted on the circuit board 31. The driving source 40 is arranged behind the circuit board 31 except for a part of the shaft 41. The driving source 40 is provided by combining a reduction-gear mechanism (not shown) and a step motor, for example.

The case 60 is formed in the shape of a dish with resin. The case 60 is disposed to cover the circuit board 31 and the controller 32 on a back side of the dial board 10. The case 40 is made of resin, such as polypropylene etc.

The pointer 20 is rotatable about a rotational center axis O. The meter 1 has the electromagnetic power supplying device around the center axis O. The center axis O is extending along the front and back direction of the meter 1. The base end 20a is formed in a bottomed cylindrical shape. The base end 20a is colored by light blocking paint, such as black paint. The base end 20a is connected with an top end of the bracket 21 and an extended portion 20c of the pointer 20. The extended portion 20c radially and outwardly extends from the base end 20a to the distal end 20b. The base end 20a covers the light source 50 which is disposed within the inside of the base end 20a. The base end 20a blocks light from the light source 50 from leaking out through the base end 20a. The extended portion 20c and the distal end 20b are made of translucent resin or clear resin with translucent paint. The extended portion 20c transmits light along a longitudinal direction. Light from the light source 50 enters into the extended portion 20c via an end surface 20d inserted into the base end 20a, and is guided to the distal end 20b. Light leaks from the extended potion 20c to illuminate itself.

The light source 50 is provided by a chip type light emitting diode, and is mounted on a first circuit board 51 fixed on the bracket 21. The first circuit board 51 is disposed in the base end 20a. The light source 50 is disposed on the center axis O. The light source 50 has a light emitting direction which is oriented to the end surface 20d of the extended portion 20c. In other words, the light source 50 has a light outlet which directly faces the end surface 20d. The light source 50 is electrically connected with the secondary module 70 mounted on the first circuit board 51. The light source 50 is activated to project light, such as white light etc., by being supplied with power from the secondary module 70. The light source 50 has directivity which highly concentrates light toward the end surface 20d. The extended portion 20c emits light by guiding and distributing light supplied from the end surface 20d. As a result, the pointer 20 works as a self-illuminated pointer which emits light. Thus, the light source 50 illuminates the pointer 20 with high brightness.

The bracket 21 is formed in a long and slender bottomed cylindrical shape with resin. The shaft 41 is inserted in an opening 21a of the bracket 21. The bracket 21 has a bottom 21b on which movable components, such as the base end 20a, the extended portion 20c, and the first circuit board 51 are securely mounted. The movable components may be fixed to the outside of the bottom 21b by welding or heat calking. The bracket 21 penetrates the opening 13 formed on the dial board 10, and supports the pointer 20. The bracket 21 transmits rotation of the shaft 41 to the pointer 20. The light source 50 is mounted on the first circuit board 51. As a result, the light source 50 rotates with the pointer 20.

The secondary module 70 has a secondary coil 72. The secondary coil 72 is formed in a flat annular shape. The secondary module 70 is formed in an annular shape which surrounds the center axis O. The secondary module 70 is mounted on a front side of the first circuit board 51 within the base end 20a. The secondary coil 72 has a center axis coincide with the center axis O. The secondary coil 72 is wound around the center axis O. The secondary module 70 is disposed to overlap with the primary module 80 with respect to a longitudinal direction of the center axis O. The secondary module 70 and the primary module 80 are distanced small distance L, e.g., about several millimeters. The secondary module 70 and the primary module 80 are coupled with each other in a wireless fashion to transmit electric power to activate the light source 50. The secondary module 70 supplies electric power to the light source 50.

The primary module 80 has a primary coil 82. The primary coil 82 is formed in a flat annular shape. The primary coil 82 has a diameter slightly larger than a diameter of the secondary coil 72. The primary coil 82 is a power transmitting coil 82. The primary module 80 is formed in an annular shape which surrounds the center axis O. The primary coil 82 has a center axis coincide with the center axis O. The primary coil 82 is wound around the center axis O. The secondary coil 72 and the primary coil 82 are arranged to oppose each other.

The primary module 80 is supported on a support member 91 made of resin. The support member 91 is disposed on the circuit board 31. The support member 91 is formed in a cylindrical shape. The primary module 80 is mounted on a second circuit board 81 fixed on the support member 91. The second circuit board 81 is fixed on a side of the support member 91 close to the dial board 10.

The primary module 80 is electrically connected with the circuit board 31 via a terminal 90. The terminal 90 is embedded in the support member 91. The primary module 80 is connected with a power terminal 100 and the controller 32. The power terminal 100 is supplied with power from a battery on the vehicle when an ignition switch or a power switch of the vehicle is turned on. The terminal 90 is insulated from peripheral components by the support member 91.

The controller 32 controls the driving source 40. The controller 32 also controls the primary module to control voltage supplied to the light source 50. The controller 32 controls turn-on and turn-off of the primary module 80. The primary module 80 generates radio frequency exciting current under the control of the controller 32. The primary module 80 supplies the radio frequency exciting current to the primary coil 82 to excite the primary coil 82. The primary coil 82 generates radio frequency electromagnetic field which passes through the secondary coil 72. The radio frequency electromagnetic field induces current in the secondary coil 72. The secondary module 70 converts the induced current into a DC current. The secondary module 70 supplies the DC current to the light source 50. Thus, the primary module 80 and the secondary module 70 perform a wireless power transmission.

The base end 20a is formed to cover the opening 13 from the viewer. The base end 20a has a larger diameter than a diameter of the secondary coil 72 and secondary module 70 to cover them. The primary module 80 and the secondary module 70 are formed in an annular plate shape and are arranged about the bracket 21. The primary coil 82 and the secondary coil 72 are arranged radial outside of the bracket 21. Therefore, the bracket 21 provides magnetic path for coupling the coils 82 and 72. A portion of the bracket 21 formed in a cylindrical shape with hollow inside provides the magnetic path. The coils 82 and 72 are on both sides of the dial board 10 respectively. At least an inner diameter of the coils 82 and 72 are smaller than an inner diameter of the opening 13.

The support member 91 has at least one leg extending along the bracket 21 and a support bed on which the primary module 80 and the circuit board 81 are mounted. The support member 91 is extended from the circuit board 31 to a vicinity to the dial board 10. The support bed is placed in parallel with the dial board 10. The support bed stably supports the primary module 80 and the circuit board 81 in proper positions.

According to the embodiment, the light source 50 can be disposed to be rotatable with the pointer 20. The light source 50 can be disposed close to the pointer 20. Therefore, it is possible to illuminate the pointer 20 with high brightness.

According to the embodiment, power supply to the light source 50 is carried out by the electromagnetic power supplying device 70 and 80. The electromagnetic power supplying device 70 and 80 can supply power in a wireless manner. Therefore, it is possible to eliminate connecting components for supplying power, such as an FPC. According to the embodiment, it is possible to simplify a structure about the center axis O. As a result, it is possible to illuminate the pointer 20 with high brightness by using a simple structure which may apply less load on the pointer 20.

The primary module 80 and the secondary module 70 always overlap each other with constant relative positioning for all location of the pointer 20. Therefore, it is possible to maintain stable electromagnetic coupling between them.

Since the center axis O passes through the light source 50, it is possible to dispose the light source 50 close to the secondary module 70 and to shorten wirings to the light source 50. As a result, it is possible to simplify a structure around the light source 50.

Second Embodiment

Figure 4:
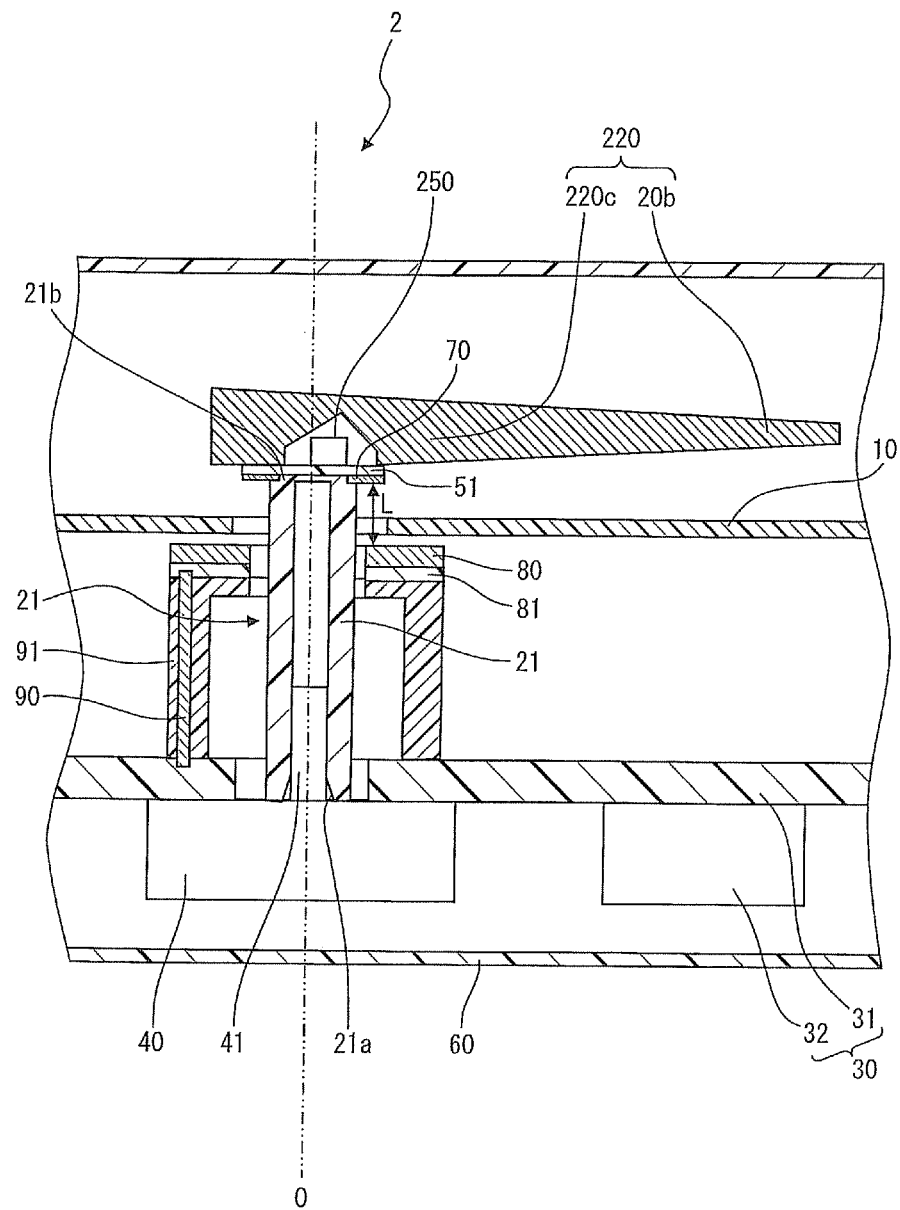
FIG. 4 is a sectional view of a meter according to a second embodiment of the present disclosure.

FIG. 4 shows the second embodiment. The second embodiment discloses a meter 2 which is a modification of the meter 1 in the first embodiment. The meter 2 has a secondary module 70 which is mounted on a side surface of the first circuit board 51, which is closer to the primary module 80 than the other side. The annular shape of the secondary module 70 enables this arrangement. The primary module 80 is mounted on a side surface of the second circuit board 81, which is closer to the secondary module 70 than the other side. In the preceding embodiment, the pointer 20 has the end surface 20d to receive light from the light source 50. Alternatively, it is possible to employ the pointer 220 which has an extended portion 220c as shown in FIG. 4. The extended portion 220c has a notch on a middle part thereof. The notch is formed to place a light source 250 therein. In addition, the light source 250 may be disposed in a manner that the light source 250 is shifted from the center axis O as shown in FIG. 4.

According to the second embodiment, it is possible to arrange the primary module 80 and the secondary module 70 within a short distance L and to improve efficiency for transmitting power.

Further, since the first circuit board 51 does not impede magnetic flux between the primary module 80 and the secondary module 70, it is possible to reduce lowering of efficiency caused by the first circuit board 51.

Other Embodiments

Although the present invention is described based on the illustrated embodiments, the present invention should not be limited to such embodiments illustrated, may be implemented in other ways and be applied to any combinations and modifications without departing from the scope of the invention.

In the above embodiments, the primary module 80 and the secondary module 70 are formed in annular shapes respectively. Alternatively, the modules may be formed in other shapes, such as a circular disc shape or a rectangular plate shape.

In the preceding embodiments, the base end 20a is colored with light blocking paint. Alternatively, the base end 20a may be translucently colored by using translucent paint etc.

What is claimed is:
1. A meter with a pointer comprising:
a dial board defining an opening having an opening diameter;
a pointer which rotates to point to an indicator on the dial board showing a value, the pointer rotates about a rotational center axis extending through the opening of the dial board;
a light source which rotates with the pointer and illuminates the pointer;
a primary module which transmits electric power in a wireless manner, the primary module has an annular shape with a primary outer diameter and a primary inner diameter; and
a secondary module which rotates with the pointer and supplies electric power to the light source by receiving electric power from the primary module, the secondary module has an annular shape with a secondary outer diameter and a secondary inner diameter, the secondary module is positioned such that the secondary outer diameter and the secondary inner diameter both surround the rotational center axis;
wherein the primary inner diameter and the secondary inner diameter are each smaller than the opening diameter; and
wherein secondary outer diameter is smaller than the opening diameter such that the secondary outer diameter opposes the primary module through the opening of the dial board.

2. The meter in claim 1, wherein
the primary module and the secondary module overlap and are aligned along the rotational center axis.

3. The meter in claim 1, further comprising:
a first circuit board on which the secondary module is mounted; and
a second circuit board on which the primary module is mounted, wherein
the first circuit board and the second circuit board are disposed to oppose each other, and wherein
the secondary module is mounted on a side of the first circuit board, which is closer to the primary module than the other side, and wherein
the primary module is mounted on a side of the second circuit board, which is closer to the secondary module than the other side.

4. The meter of claim 1, wherein the dial board is between the primary module and the secondary module.

5. The meter of claim 4, wherein the light source is disposed on the rotational center axis.

6. The meter of claim 5, wherein the primary module has an overall flat shape; and wherein the secondary module has an overall flat shape.

* * * * *